(12) United States Patent
Feeney

(10) Patent No.: US 10,282,705 B2
(45) Date of Patent: May 7, 2019

(54) HIGHLIGHTING MESSAGE ADDRESSES

(71) Applicant: Dropbox, Inc., San Francisco, CA (US)

(72) Inventor: Scott Feeney, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 295 days.

(21) Appl. No.: 14/494,013

(22) Filed: Sep. 23, 2014

(65) Prior Publication Data

US 2016/0085421 A1 Mar. 24, 2016

(51) Int. Cl.
| | | |
|---|---|---|
| *G06Q 10/10* | (2012.01) | |
| *G06F 3/0484* | (2013.01) | |
| *G06F 9/451* | (2018.01) | |
| *H04L 12/58* | (2006.01) | |
| *G06F 3/0481* | (2013.01) | |
| *G06F 9/44* | (2018.01) | |

(52) U.S. Cl.
CPC ......... *G06Q 10/107* (2013.01); *G06F 3/0481* (2013.01); *G06F 3/04842* (2013.01); *G06F 9/4443* (2013.01); *G06F 9/451* (2018.02); *H04L 51/16* (2013.01)

(58) Field of Classification Search
CPC .............................. G06Q 10/107; H04L 51/16
See application file for complete search history.

(56) References Cited

U.S. PATENT DOCUMENTS

| | | | |
|---|---|---|---|
| 8,056,011 B2 | 11/2011 | Fitzpatrick et al. | |
| 8,065,369 B2* | 11/2011 | Turski .................. | G06Q 10/107 709/200 |
| 8,166,119 B2* | 4/2012 | Ligh .................... | G06F 3/04886 709/206 |
| 8,250,154 B2* | 8/2012 | Limberg .............. | G06Q 10/107 455/412.1 |
| 8,341,230 B2* | 12/2012 | Scott .................... | G06Q 10/107 709/206 |
| 9,436,932 B2* | 9/2016 | Guy ...................... | G06Q 10/107 |
| 9,450,902 B2* | 9/2016 | Guenther .............. | G06F 3/0482 |
| 2003/0212746 A1* | 11/2003 | Fitzpatrick .......... | H04L 12/1827 709/206 |

(Continued)

OTHER PUBLICATIONS

Herbsleb, James D. et al., "Introducing Instant Messaging and Chat in the Workplace", CHI 2002, vol. No. 4, Issue No. 1, Apr. 2002, pp. 171-178.

*Primary Examiner* — Alvin H Tan
(74) *Attorney, Agent, or Firm* — Polsinelli PC

(57) ABSTRACT

In some implementations, a graphical user interface of an electronic messaging system can highlight addressees of a message in a group of candidate message recipients. For example, the graphical user interface can present graphical objects corresponding to candidate message recipients. When a user composes a message, the user can provide input identifying a recipient of the message. In response to the user input identifying the recipient of the message, the graphical user interface can highlight a graphical object corresponding to the identified recipient. In some implementations, the graphical user interface can subdue (e.g., grey out) graphical objects corresponding to candidate message recipients that are not identified in the message in order to highlight the identified recipient objects. In some implementations, a message recipient can be an individual contact (e.g., person). In some implementations, a message recipient can be a message stream.

18 Claims, 5 Drawing Sheets

(56) References Cited

U.S. PATENT DOCUMENTS

| | | | |
|---|---|---|---|
| 2006/0075044 A1* | 4/2006 | Fox | G06Q 10/107 709/206 |
| 2008/0307322 A1* | 12/2008 | Stochosky | G06F 3/0481 715/752 |
| 2011/0231499 A1* | 9/2011 | Stovicek | H04M 1/72547 709/206 |
| 2013/0086175 A1* | 4/2013 | Claux | G06F 17/211 709/206 |
| 2013/0125019 A1* | 5/2013 | Vymenets | G06F 17/21 715/752 |
| 2014/0040368 A1 | 2/2014 | Janssens | |
| 2014/0096034 A1 | 4/2014 | Blair | |
| 2015/0019658 A1* | 1/2015 | Barrera | H04L 51/16 709/206 |

* cited by examiner

HIGHLIGHTING MESSAGE ADDRESSES

TECHNICAL FIELD

This disclosure generally relates to electronic messaging.

BACKGROUND

Various electronic messaging systems are in use today. E-mail, chat, instant messaging, and other forms of electronic messaging are used to facilitate fast communication between people and groups. Unfortunately, because users of these electronic messaging systems are often exchanging many messages every day with many different recipients, users often make the mistake of addressing and sending messages to unintended recipients.

SUMMARY

In some implementations, a graphical user interface of an electronic messaging system can highlight addressees of a message in a group of candidate message recipients. For example, the graphical user interface can present graphical objects corresponding to candidate message recipients. When a user composes a message, the user can provide input identifying a recipient of the message. In response to the user input identifying the recipient of the message, the graphical user interface can highlight a graphical object corresponding to the identified recipient. In some implementations, the graphical user interface can subdue (e.g., grey out) graphical objects corresponding to candidate message recipients that are not identified in the message in order to highlight the identified recipient objects. In some implementations, a message recipient can be an individual contact (e.g., person). In some implementations, a message recipient can be a message stream.

Particular implementations provide at least the following advantages: A user who is composing a message can quickly verify, based on the appearance of the messaging graphical user interface, who will receive a message that the user is composing. A user of the messaging graphical user interface will make fewer message addressing mistakes. Fewer messages will be sent to and received by unintended recipients.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
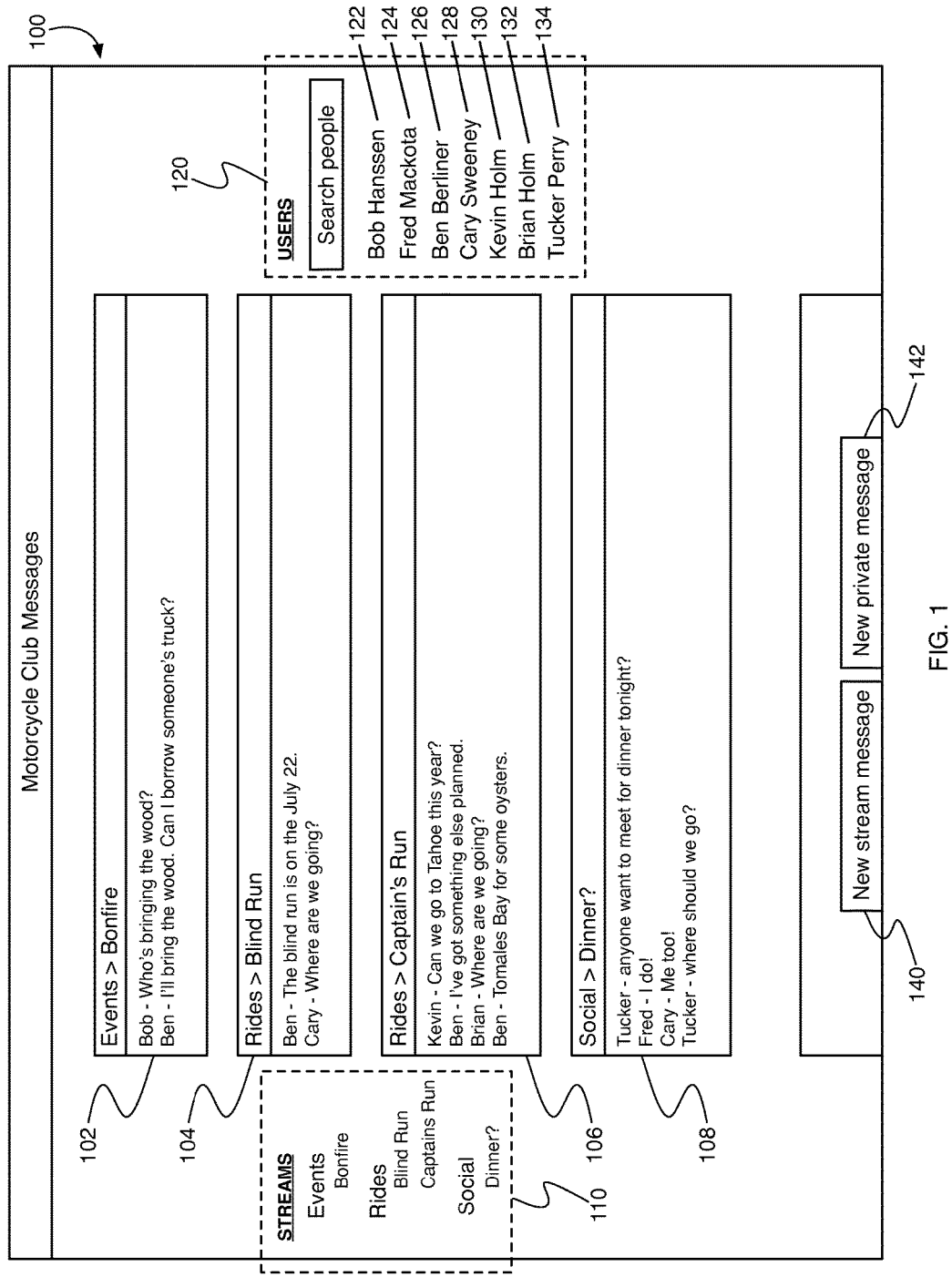
FIG. 1 illustrates an example graphical user interface for composing, sending and viewing electronic messages.

FIG. 1 illustrates an example graphical user interface 100 for composing, sending and viewing electronic messages. For example, graphical user interface (GUI) 100 can be a user interface of an electronic messaging system, such as an email system, chat system, instant messaging system, and the like. A computing device (e.g., laptop computer, desktop computer, tablet computer, handheld device, etc.) can present GUI 100 on a display of the computing device when a user invokes a corresponding messaging application, for example. The messaging application can be a web application displayed in a web browser. The messaging application can be a stand-alone executable client application specifically built for the electronic messaging system. The computing device can be a client device of a client-server electronic messaging system, for example. The user of the client device can provide input to GUI 100 to compose and send electronic messages to a server device for distribution to other client devices (e.g., recipient devices). When invoked or displayed, GUI 100 can receive electronic messages from the server device and present the messages on GUI 100. Thus, GUI 100 can be a graphical user interface of a messaging system client application (e.g., web application, stand alone executable, etc.).

In some implementations, GUI 100 can include graphical objects corresponding to candidate recipients of an electronic message. For example, the graphical objects can identify candidate recipients and/or present messages sent to the candidate recipients.

In some implementations, a candidate recipient can be a message stream. For example, a message stream can be a collection of messages corresponding to a topic. A user of the messaging system can provide input to GUI 100 to cause the client device to send a message to a particular message stream (e.g., identified by topic and/or subtopic) and have the message presented in the message stream. Users of the messaging system can subscribe to a message stream using a client device to view the messages corresponding to the message stream on the client device. The messages of the message stream can be presented in a message stream graphical object (e.g., stream graphical objects 102-108) on GUI 100 when a subscribing user invokes GUI 100.

In some implementations, GUI 100 can include stream graphical objects 102-108 corresponding to candidate message streams. For example, graphical object 102 can correspond to an "Events" topic having a subtopic "Bonfire." When a user (e.g., using a client device) sends a message to the "Events>Bonfire" stream, the message will be presented in graphical object 102. Similarly, graphical objects 104 and 106 correspond to the stream topic "Rides." However, graphical objects 104 and 106 have different stream subtopics "Blind Run" and "Captains Run," respectively. When a user sends a message to the "Rides>Blind Run" message stream, the message will be displayed in graphical object 104. When a user sends a message to the "Rides>Captain's Run" message stream, the message will be displayed in graphical object 106. Graphical object 108 corresponds to the stream topic "Social" and subtopic "Dinner?." When a user sends a message to the "Social>Dinner?" message stream, the message will be displayed in graphical object 108.

In some implementations, a user can select which message stream graphical objects 102-108 are displayed on GUI 100 by selecting a topic from topic menu 110. For example, GUI 100 can include topic menu 110. A user can select one of the topics or subtopics from menu 110 to filter which message streams are displayed on GUI 100. For example, when a user selects the "Events" topic presented in menu 110, only graphical object 102 will be displayed because graphical object 102 is the only stream object associated with the "Events" topic. Similarly, a user can select the "Blind Run" subtopic of the "Rides" topic in menu 110 to cause GUI 100 to display only graphical object 104. When the user selects the "Rides" topic from menu 110, both graphical objects 104 and 106 will be displayed on GUI 100 because both graphical object 104 and graphical object 106 are related to the "Rides" stream topic. A user can select the "STREAMS" menu item to view all stream topics and subtopics.

In some implementations, a candidate recipient can be an individual person. For example, GUI 100 can present contacts 120 (e.g., candidate recipients) associated with the user or associated with the messaging system. For example, contacts 120 can include graphical objects 122-134 identifying other users who have subscribed to the messaging system. Contacts 120 can include graphical objects 122-134 identifying other users who are contacts of the user of GUI 100.

In some implementations, GUI 100 can include graphical object 140 for creating a new message to send to a message stream. For example, a user can select graphical object 140 to display GUI 200 of FIG. 2. In some implementations, GUI 100 can include graphical object 142 for creating a new private message to individual contacts. For example, a user can select graphical object 142 to display GUI 300 of FIG. 3.

Figure 2:
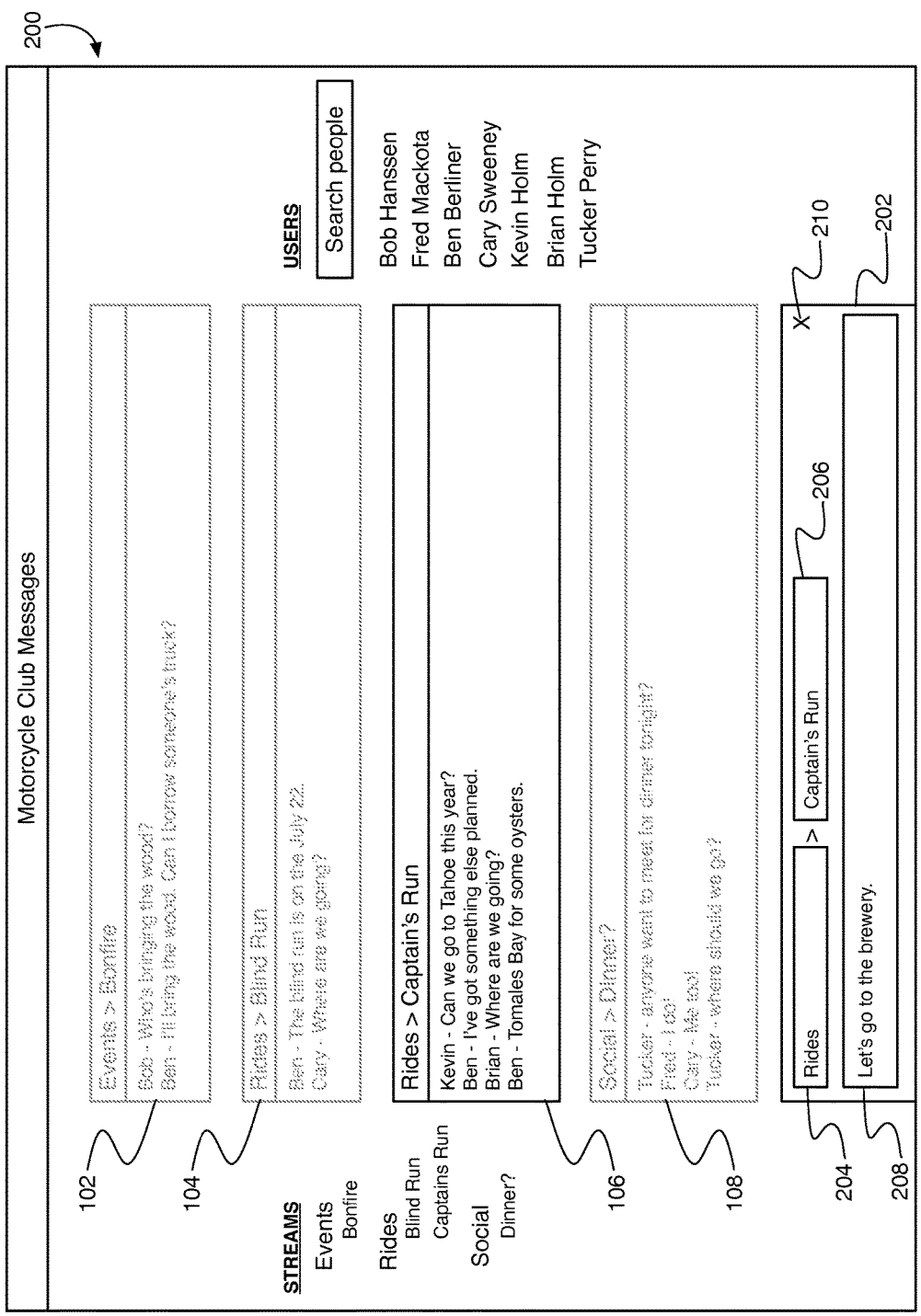
FIG. 2 illustrates an example graphical user interface configured to highlight an addressed message stream.

FIG. 2 illustrates an example graphical user interface 200 configured to highlight an addressed message stream. For example, a client device can display GUI 200 in response to a user selecting graphical object 140 of GUI 100. GUI 200 can present graphical element 202 for composing a new message (e.g., a chat message) for a message stream in response to the user selecting graphical object 140 of GUI 100, for example. Graphical element 202 can include graphical objects 204 and 206 for specifying (e.g., identifying, electing, etc.) the message stream to which the new stream message is addressed. For example, graphical object 204 can receive input (e.g., text, menu selection, etc.) specifying a stream topic. Graphical object 206 can receive input (e.g., text, menu selection, etc.) specifying a subtopic. In the example shown in FIG. 2, the user has provided input to graphical object 204 specifying the topic "Rides." The user has provided input to graphical object 206 specifying the subtopic "Captain's Run." Thus, when the user inputs a new message into graphical object 208 (e.g., text input box) and submits the message to the messaging system (e.g., presses an enter key), the new message will be presented in graphical object 106 corresponding to the "Rides>Captain's Run" message stream. If the user wishes to cancel the new message without submitting the message to the message stream, the user can select graphical object 210 to discard the message.

In some implementations, GUI 200 can highlight the message stream object identified by a new message. For example, when the user enters the topic "Rides" into graphical object 204, GUI 200 can highlight graphical objects 104 and 106 corresponding to message streams associated with the "Rides" topic. When the user provides input to graphical object 206 specifying the subtopic "Captain's Run," GUI 200 can highlight only graphical object 106 corresponding to the "Rides>Captain's Run" message stream. In some implementations, GUI 200 can highlight the addressed message stream object by subduing the message stream objects (e.g., candidate message streams) on GUI 200 that are not addressed by the message being composed. For example, since the new message composed in graphical element 202 is addressed to the message stream corresponding to graphical object 106, GUI 200 can subdue (e.g., grey out, change the line weight, change font weight, etc.) the other message stream objects (e.g., candidate message streams) 102, 104 and 108 that are not addressed by the new message in order to highlight message stream object 106 (e.g., the elected message stream).

Alternatively, GUI 200 can highlight message stream object 106 by changing the color of object 106 (e.g., highlight in yellow, blue, green, etc.). GUI 200 can highlight message stream object 106 by increasing the line weight for object 106 relative to the other message stream objects 102, 104, and 108. GUI 200 can highlight message stream object 106 by changing the font characteristics of messages presented in message stream object 106, for example. By highlighting the addressed message stream object, GUI 200 can provide visual feedback that allows the user to quickly confirm that the message stream addressed in the new message is the message stream to which the user intends to send the new message.

Figure 3:
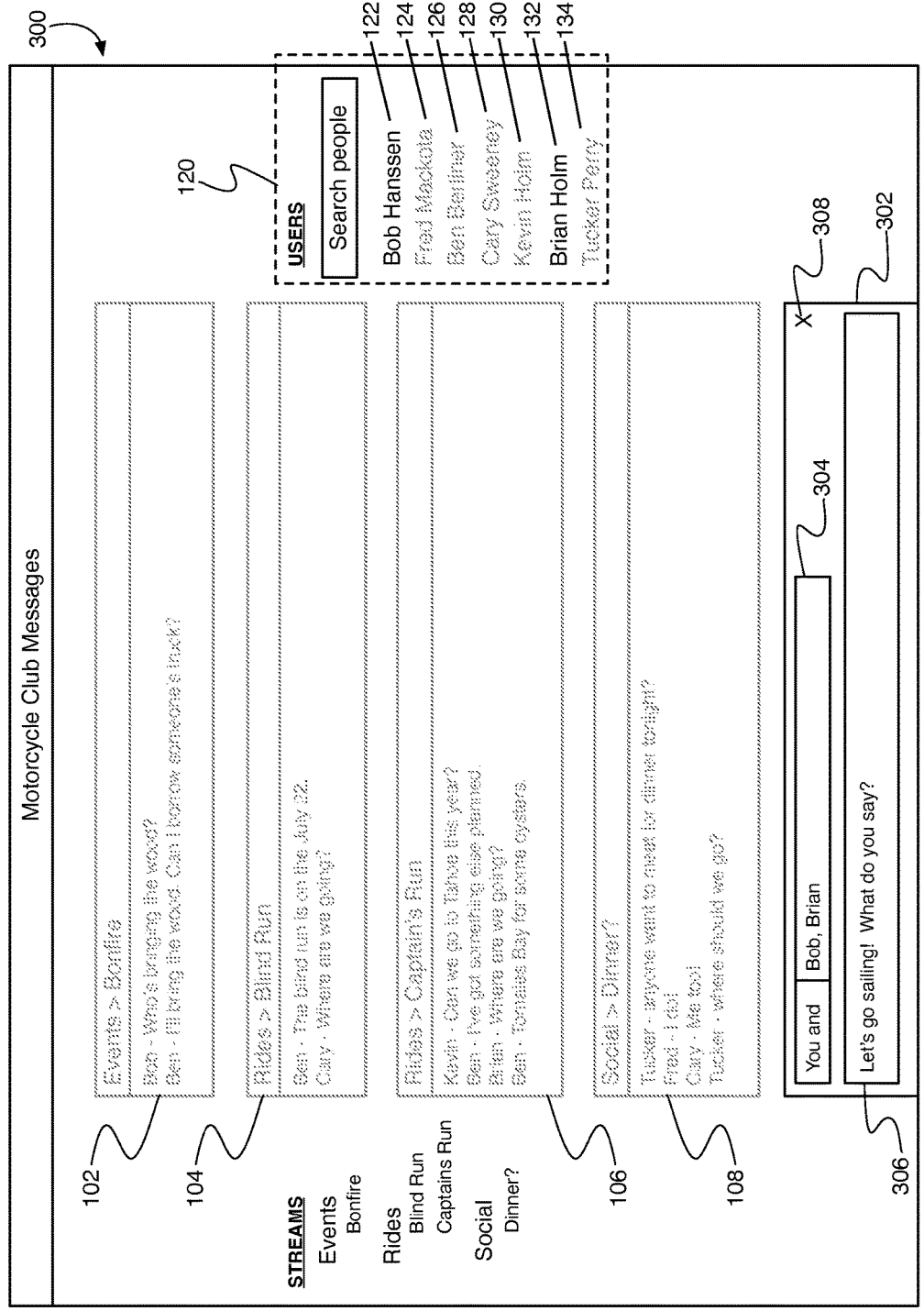
FIG. 3 illustrates an example graphical user interface configured to highlight an addressed contact.

FIG. 3 illustrates an example graphical user interface 300 configured to highlight an addressed contact. For example, a client device can display GUI 300 in response to a user selecting graphical object 142 of GUI 100. In some implementations, GUI 300 can include graphical element 302 for sending a new private message (e.g., an email message) to a contact or multiple contacts. For example, in response to selecting graphical object 142 of GUI 100, GUI 300 can present graphical element 302.

In some implementations, graphical element 302 can include address object 304. For example, address object 304 can receive input (e.g., text input) from a user specifying a contact, or contacts, to which the new private message is to be sent. Graphical element 302 can include message object 306. For example, message object 306 can receive input (e.g., text input) from the user composing the message to send to the addressed contacts. Once the message is composed and addressed, the user can provide input (e.g., press a key) to cause the message to be sent to the addressed contacts. If the user decides not to send the message, the user can select graphical element 308 to cancel the new private message.

In some implementations, GUI 300 can highlight contact objects corresponding to the contacts addressed in a new message. For example, when the user identifies contacts by providing input to address object 304, GUI 300 can highlight the addressed contacts in contact candidate list 120. For example, when the user enters a contact identifier (e.g., "Bob") corresponding to contact object 122 into address object 304, GUI 300 can highlight contact object 122. When the user enters a contact identifier (e.g., "Brian") corresponding to contact object 132, GUI 300 can highlight contact object 132.

In some implementations, GUI 300 can highlight an addressed contact object by subduing graphical objects corresponding to candidate addressees that are not addressed in a new personal message. For example, when the user enters a contact identifier (e.g., "Bob") into address object 304 corresponding to contact object 122, GUI 300 can subdue (e.g., grey out) contact objects 124-134 in order to highlight contact object 122. When the user subsequently enters a contact identifier (e.g., "Brian") into address object 304 corresponding to contact object 132, GUI 300 can restore contact object 132 to a normal presentation (e.g., not greyed out) and subdue contact objects 124, 126, 128, 130 and 134, as illustrated by FIG. 3. Alternatively, GUI 300 can highlight the graphical objects corresponding the private message addressees by changing the color, the fonts, or other attributes of the graphical objects to distinguish the addressee graphical objects from candidate contact objects that are not addressed in the private message.

In some implementations, GUI 300 can subdue message stream objects 102-108 when the user is composing a private message. For example, when the user selects to compose a new private message by selecting graphical object 142 of GUI 100, GUI 200 (e.g., the messaging application, the client device) can determine that the user is not going to compose a message to a message stream. Therefore, when the user selects graphical object 142 and graphical element 302 is displayed, GUI 300 can subdue message stream graphical objects 102-104 because the private message being composed by the user will not be addressed to any of the message streams.

Figure 4:
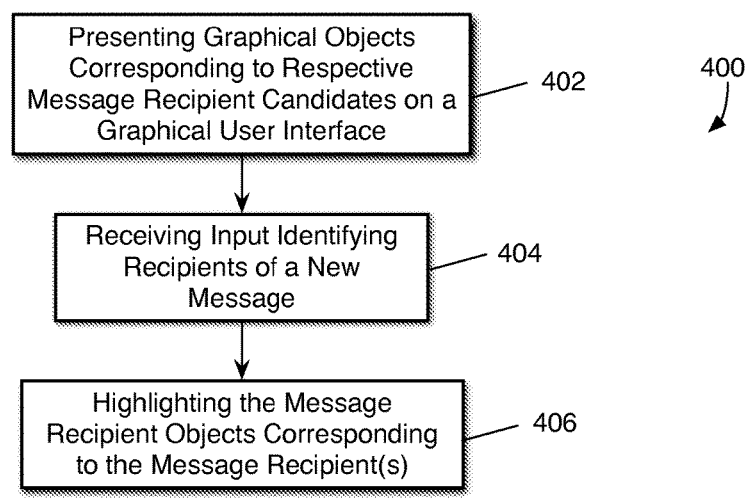
FIG. 4 is flow diagram of an example process for highlighting message addressees.

FIG. 4 is flow diagram of an example process 400 for highlighting message addressees. For example, process 400 can be performed by a client application of an electronic messaging system. The client application can execute on a computing device (e.g., client device). The client application can be configured to present graphical user interfaces 100, 200 and/or 300 described above while performing the steps of process 400.

At step 402, a client device can present graphical objects corresponding to respective message recipient candidates on a graphical user interface of a messaging application. For example, a recipient candidate can be a message stream. A recipient candidate can be a contact of the user. The client device can present graphical objects corresponding to candidate message streams and/or candidate contacts to which a user can address electronic messages. For example, the messages can be email messages, chat messages, instant messages, and/or other types of electronic messages. The candidate message streams and/or candidate contacts can be presented on GUI 100 of FIG. 1, for example.

At step 404, the client device can receive input identifying recipients of a new message. For example, the client device can receive user input through a graphical user interface (e.g., GUI 200) identifying a message stream as the recipient of an electronic message. The user can identify the message stream by topic and/or subtopic, as described above. The client device can receive user input through a graphical user interface (e.g., GUI 300) identifying a contact, or contacts, as the recipient of a private electronic message (e.g., email, instant message, etc.). The user can identify the private message recipients using contact identifiers associated with the contact recipients.

At step 406, the client device can highlight the graphical objects corresponding to the identified message recipients. For example, the client device can highlight the message recipient in response to receiving user input identifying the message recipient. When the message recipient is a message stream, the client device can highlight the graphical object corresponding to the identified message stream. When the message recipient is a contact, the client device can highlight the graphical object corresponding to the identified contact. In some implementations, the client device can highlight a graphical object corresponding to a message recipient by subduing (e.g., greying out) graphical objects corresponding to candidate recipients that are not identified in the message.

Example System Architecture

Figure 5:
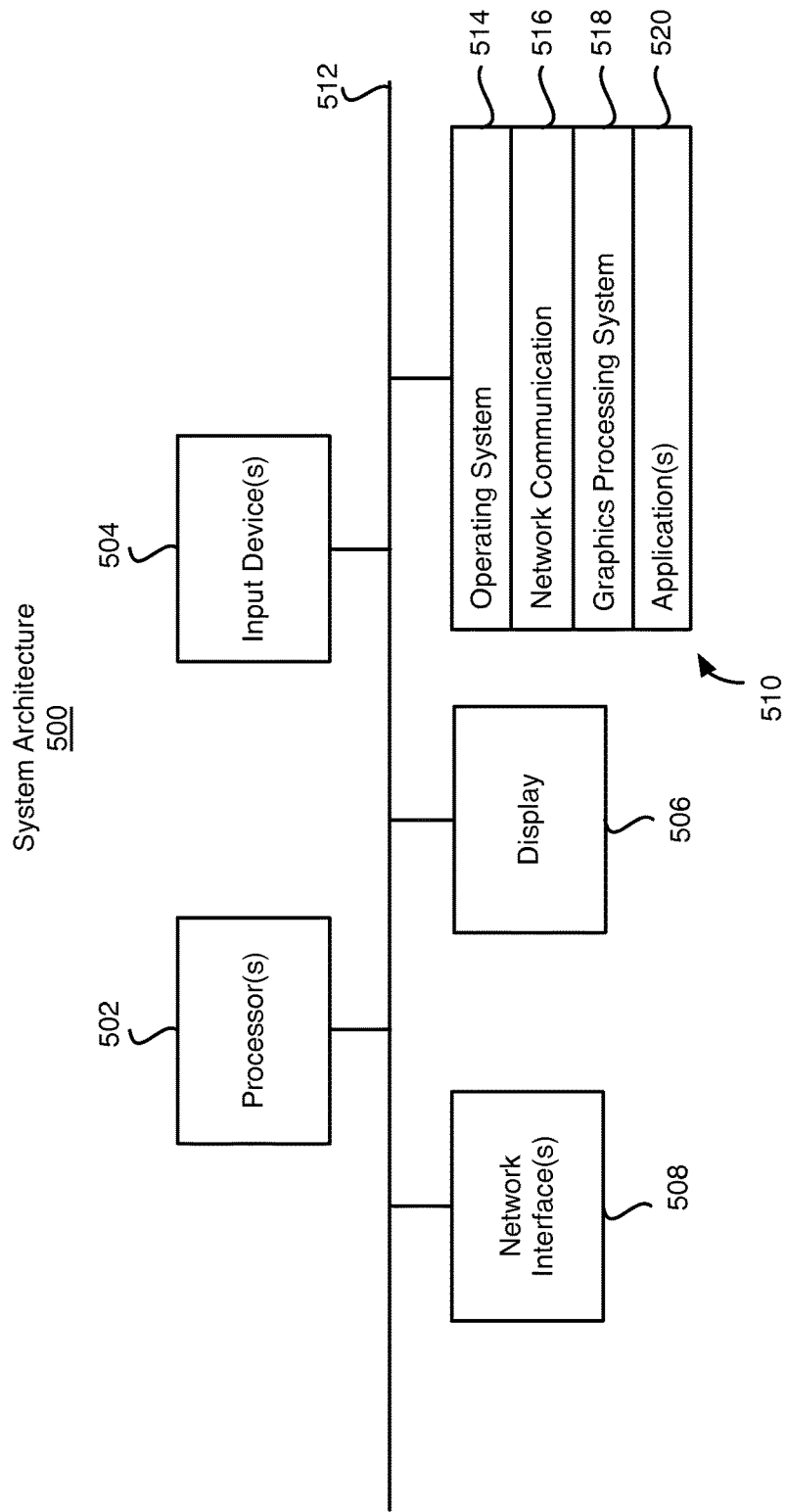
FIG. 5 is a block diagram of an example system architecture for implementing the features and processes of FIGS. 1-4.

FIG. 5 is a block diagram of an example system architecture for implementing the features and processes of FIGS. 1-4. The architecture 500 can be implemented on any electronic device that runs software applications derived from compiled instructions, including without limitation personal computers, servers, smart phones, media players, electronic tablets, game consoles, email devices, etc. In some implementations, the architecture 500 can include one or more processors 502, one or more input devices 504, one or more display devices 506, one or more network interfaces 508 and one or more computer-readable mediums 510. Each of these components can be coupled by bus 512.

Display device 506 can be any known display technology, including but not limited to display devices using Liquid Crystal Display (LCD) or Light Emitting Diode (LED) technology. Processor(s) 502 can use any known processor technology, including but are not limited to graphics processors and multi-core processors. Input device 504 can be any known input device technology, including but not limited to a keyboard (including a virtual keyboard), mouse, track ball, and touch-sensitive pad or display. Bus 512 can be any known internal or external bus technology, including but not limited to ISA, EISA, PCI, PCI Express, NuBus, USB, Serial ATA or FireWire.

Computer-readable medium 510 can be any medium that participates in providing instructions to processor(s) 502 for execution, including without limitation, non-volatile storage media (e.g., optical disks, magnetic disks, flash drives, etc.) or volatile media (e.g., SDRAM, ROM, etc.). The computer-readable medium (e.g., storage devices, mediums, and memories) can include, for example, a cable or wireless signal containing a bit stream and the like. However, when mentioned, non-transitory computer-readable storage media expressly exclude media such as energy, carrier signals, electromagnetic waves, and signals per se.

Computer-readable medium 510 can include various instructions 514 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 504; sending output to display device 506; keeping track of files and directories on computer-readable medium 510; controlling peripheral devices (e.g., disk drives, printers, etc.) which can be controlled directly or through an I/O controller; and managing traffic on bus 512. Network communications instructions 516 can establish and maintain network connections (e.g., software for implementing communication protocols, such as TCP/IP, HTTP, Ethernet, etc.).

A graphics processing system 518 can include instructions that provide graphics and image processing capabilities. For example, the graphics processing system 518 can implement the message addressee highlighting processes described with reference to FIGS. 1-4.

Application(s) 520 can be an application that uses or implements the processes described in reference to FIGS. 1-4. For example, applications 520 can include an electronic messaging client application that implements the message addressee highlighting processes described with reference to FIG. 104. The message addressee highlighting processes can also be implemented in operating system 514.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   presenting, by a computing device, a contact list on a graphical user interface of a messaging application, wherein the contact list includes a set of message recipient candidates;
   presenting, on a second area of the graphical user interface different from the contact list, at least one stream object corresponding to a message stream;
   presenting, on a third area of the graphical user interface different from the contact list and the message stream, at least one topic object corresponding to a topic stream;
   receiving, by the computing device, a selection to create a new message to send to the message stream corresponding to the at least one stream object presented on the second area of the graphical user interface;
   receiving, by the computing device, an identification of a topic corresponding to the new message;
   determining that the message stream includes a recipient for the new message, the recipient included in the set of message recipient candidates in the contact list;
   highlighting, by the computing device and based on the message stream including the recipient for the new message, the recipient;
   highlighting, by the computing device and based on the selection to create the new message to send to the message stream, the message stream in the second area of the graphical user interface different from the contact list;
   associating the topic corresponding to the new message with the at least one topic object corresponding to the topic stream, whereby selecting the topic object highlights a new message stream in the second area of the graphical user interface different from the contact list;
   receiving, by the computing device, a second selection to create a second new message to send to a second recipient;
   determining that the second recipient in the second new message is included in the set of message recipient candidates in the contact list;
   highlighting, by the computing device, the second recipient in the contact list; and
   greying out, by the computing device and based on the second selection to create the second new message to send to the second recipient, each message stream presented on the second area of the graphical user interface.

2. The method of claim 1, wherein the new message is one of an email message or a chat message.

3. The method of claim 1, wherein highlighting the second recipient in the contact list includes greying out one or more of the set of message recipient candidates that correspond to one or more recipient candidates that are not identified as recipients of the second new message.

4. The method of claim 1, wherein the selection is received after presenting the contact list.

5. The method of claim 1, further comprising presenting a graphical message request object for generating the new message and selecting the recipient.

6. The method of claim 1, wherein highlighting the second recipient in the contact list includes changing a line weight of the second recipient in the contact list.

7. A non-transitory computer-readable medium comprising:
    instructions stored thereon which, when executed by one or more processors, cause the one or more processors to:
        present a contact list on a graphical user interface of a messaging application, wherein the contact list includes a set of message recipient candidates;
        present, on a second area of the graphical user interface different from the contact list, at least one stream object corresponding to a message stream;
        present, on a third area of the graphical user interface different from the contact list and the message stream, at least one topic object corresponding to a topic stream;
        receive a selection to create a new message to send to the message stream corresponding to the at least one stream object presented on the second area of the graphical user interface;
        receive an identification of a topic corresponding to the new message;
        determine that the message stream includes a recipient of the new message, the recipient included in the set of message recipient candidates in the contact list; and
        highlight, based on the message stream including the recipient for the new message, the recipient;
        highlight, based on the selection to create the new message to send to the message stream, the message stream in the second area of the graphical user interface different from the contact list;
        associate the topic corresponding to the new message with the at least one topic object corresponding to the topic stream, whereby selection of the topic object highlights the message stream in the second area of the graphical user interface different from the contact list;
        receive a second selection to create a second new message to send to a second recipient;
        determine that the second recipient in the second new message is included in the set of message recipient candidates in the contact list;
        highlight the second recipient in the contact list; and
        grey out based on the second selection to create the second new message to send to the second recipient, each message stream presented on the second area of the graphical user interface.

8. The non-transitory computer-readable medium of claim 7, wherein the new message is one of an email message or a chat message.

9. The non-transitory computer-readable medium of claim 7, wherein the graphical user interface includes an input object for requesting to generate the second new message and selecting the second recipient, wherein the input object is configured to display the second recipient in an address input portion of the input object.

10. The non-transitory computer-readable medium of claim 7, wherein the instructions that cause highlighting the second recipient in the contact list cause the one or more processors to grey out one or more of the set of message recipient candidates that correspond to one or more recipient candidates that are not identified as recipients of the second new message.

11. The non-transitory computer-readable medium of claim 7, wherein presenting the contact list comprises displaying a list of contacts involved in the message stream, each contact in the list of contacts being added to the list of contacts for presentation on the graphical user interface in response to participating in a message stream from the one or more message streams.

12. The non-transitory computer-readable medium of claim 7, wherein highlighting the second recipient in the contact list comprises changing a line weight of the second recipient in the contact list.

13. A system comprising:
    one or more processors; and
    at least one non-transitory computer-readable medium including instructions which, when executed by the one or more processors, cause the system to:
        present a contact list on a graphical user interface of a messaging application, wherein the contact list includes a set of message recipient candidates;
        present, on a second area of the graphical user interface different from the contact list, at least one stream object corresponding to a message stream;
        present, on a third area of the graphical user interface different from the contact list and the message stream, at least one topic object corresponding to a topic stream;
        receive a selection to create a new message to send to the message stream corresponding to the at least one stream object presented on the second area of the graphical user interface;
        receive an identification of a topic corresponding to the new message;
        determine that the message stream includes a recipient of the new message, the recipient included in the set of message recipient candidates in the contact list;
        highlight, based on the message stream including the recipient for the new message, the recipient;
        highlight, based on the selection to create the new message to send to the message stream, the message stream in the second area of the graphical user interface different from the contact list;
        associate the topic corresponding to the new message with the at least one topic object corresponding to the topic stream, whereby selection of the topic object highlights the message stream in the second area of the graphical user interface different from the contact list;
        receive a second selection to create a second new message to send to a second recipient;
        determine that the second recipient in the second new message is included in the set of message recipient candidates in the contact list;
        highlight the second recipient in the contact list; and
        grey out based on the second selection to create the second new message to send to the second recipient, each message stream presented on the second area of the graphical user interface.

14. The system of claim 13, wherein the new message is one of an email message or a chat message.

15. The system of claim 13, wherein the graphical user interface includes a graphical input area comprising an interface for requesting to generate the second new message and selecting the second recipient, wherein the contact list is displayed in a different area of the graphical user interface than the graphical input area.

16. The system of claim 13, wherein the instructions that cause highlighting the second recipient in the contact list cause the system to grey out one or more of the set of message recipient candidates that correspond to one or more recipient candidates that are not identified as recipients of the second new message.

17. The system of claim 13, wherein the contact list is presented prior to receiving the selection.

18. The system of claim 13, wherein highlighting the second recipient in the contact list comprises changing a line weight of the second recipient in the contact list.

\* \* \* \* \*